(No Model.) 3 Sheets—Sheet 1.
A. S. BIGELOW.
PRESSURE REGULATOR FOR FERMENTING LIQUIDS.
No. 324,642. Patented Aug. 18, 1885.
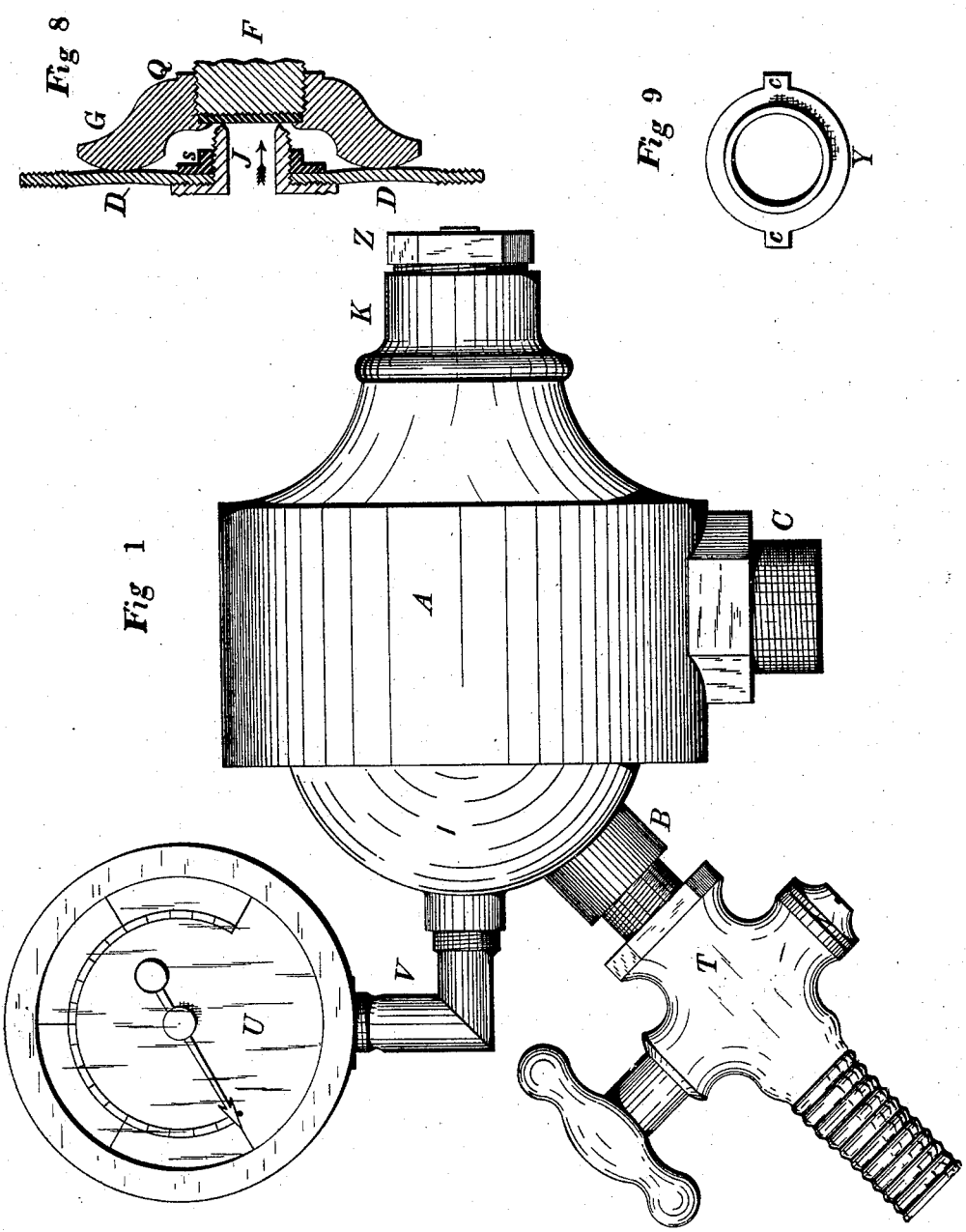
WITNESSES
H. G. Phillips.
D. Denniston.
INVENTOR
Albert S. Bigelow,
by Geo. B. Selden,
Attorney (No Model.) 3 Sheets—Sheet 2.
A. S. BIGELOW.
PRESSURE REGULATOR FOR FERMENTING LIQUIDS.
No. 324,642. Patented Aug. 18, 1885.
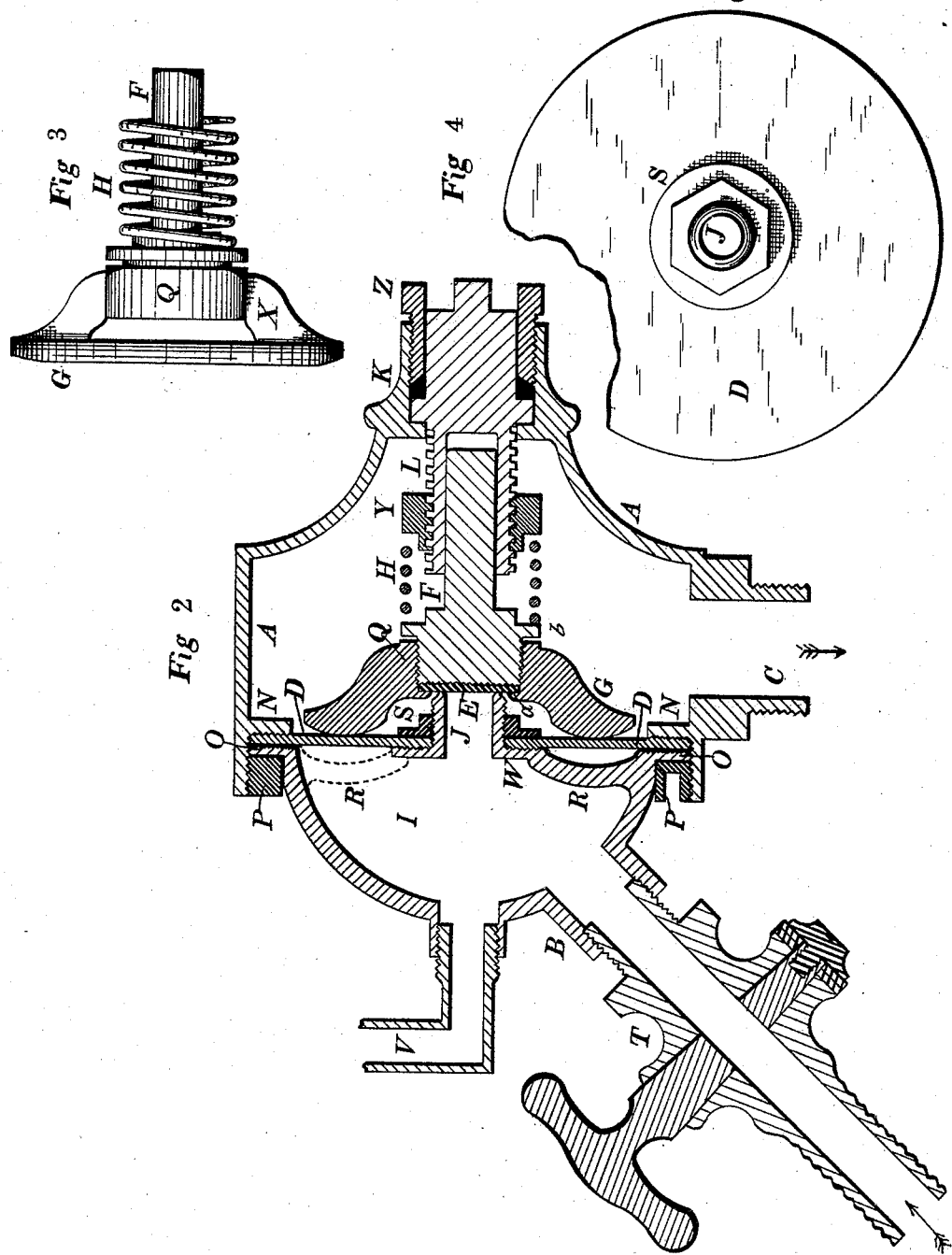
WITNESSES
H. G. Phillips.
D. Denniston.
INVENTOR
Albert S. Bigelow,
by Geo. B. Selden,
Attorney (No Model.) 3 Sheets—Sheet 3.

A. S. BIGELOW.
PRESSURE REGULATOR FOR FERMENTING LIQUIDS.

No. 324,642. Patented Aug. 18, 1885.

WITNESSES
H. G. Phillips
D. Denniston

INVENTOR
Albert S. Bigelow,
by Geo. B. Selden,
Attorney

United States Patent Office.

ALBERT S. BIGELOW, OF ROCHESTER, NEW YORK, ASSIGNOR TO THE EUREKA SPUND APPARATUS COMPANY, OF SAME PLACE.

PRESSURE-REGULATOR FOR FERMENTING LIQUIDS.

SPECIFICATION forming part of Letters Patent No. 324,642, dated August 18, 1885.

Application filed June 26, 1885. (No model.)

*To all whom it may concern:*

Be it known that I, ALBERT S. BIGELOW, of Rochester, New York, have invented certain Improvements in Pressure-Regulators for Fermenting Liquids, of which the following is a specification, reference being had to the accompanying drawings.

My invention relates to improvements in regulators for controlling the pressure at which the gases produced by fermentation are allowed to escape from the vessels in which the fermentation is carried on, which improvements are fully described in the following specification, and the novel features thereof specified in the annexed claims.

Figure 6:
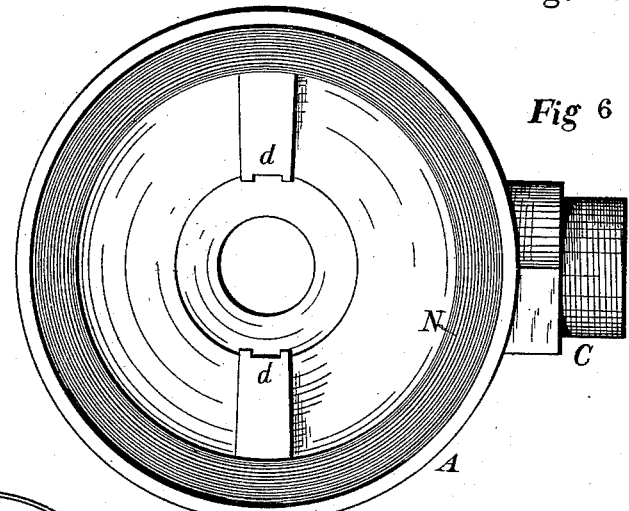
Figure 5:
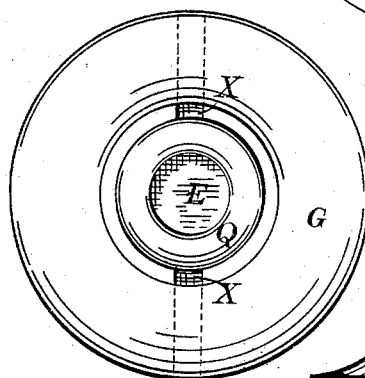
Figure 7:
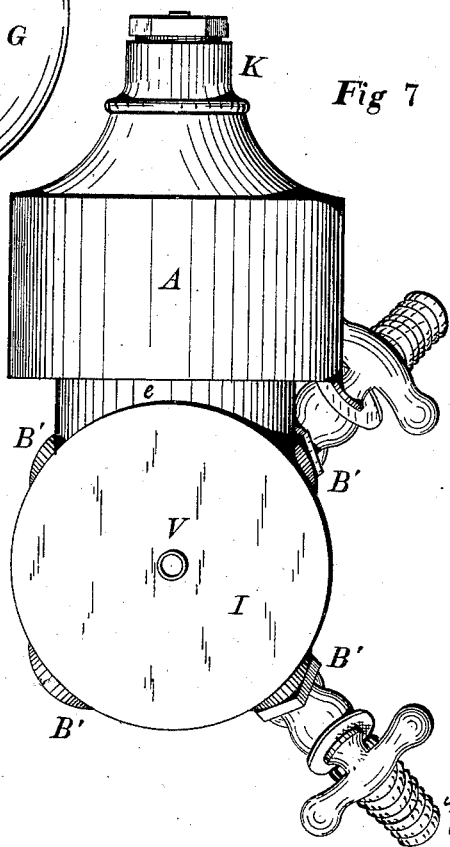

My improved pressure-regulator is represented in the accompanying drawings, in which Figure 1 is an elevation. Fig. 2 is a central longitudinal section. Fig. 3 represents the valve-stem and ring detached. Fig. 4 represents the diaphragm detached. Fig. 5 is an end view of the valve and ring. Fig. 6 represents the interior of the case as seen from the left-hand end of Fig. 2. Fig. 7 is a plan view representing a modification. Fig. 8 is a partial section illustrating the operation of the diaphragm. Fig. 9 is an end view of the nut on the adjusting-screw.

My improved pressure-regulator is represented in the accompanying drawings, in which A is the case or shell; B, the inlet-pipe; C, the outlet; D, the flexible diaphragm; E, the valve; F, the valve-stem, and G the ring or annulus by which the movement of the diaphragm caused by the pressure of the gases is transmitted to the valve-stem and valve.

H is a coiled spring surrounding the valve-stem, and serving to keep the inlet-chamber I, Fig. 2, closed by pressing the valve E against the valve-seat formed by the end of the tube J, except when the pressure of the gases in the inlet-chamber becomes sufficient to overcome the tension of the spring.

As represented in the drawings, the case A is cylindrical in shape and of sufficient dimensions to inclose the valve, ring, and spring, its end opposite the diaphragm being provided with a tubular extension or socket, K, which receives the adjusting-screw L, by which the tension of the spring H is regulated. The case A is provided with the circular flange N, Figs. 2 and 6, against which the edges of the diaphragm D are secured by the flange O of the inlet-chamber I and the screw-ring P. The edge of the case is threaded internally so as to receive the screw-ring P, which holds both the inlet-chamber and the diaphragm in place against the annular flange N. The screw-ring is provided with lugs or openings for the purpose of adapting it to be inserted or removed by means of a suitable wrench. The opposing surfaces of the flanges O on the inlet-chamber and N on the case are preferably roughened or grooved, so that the edge of the diaphragm is firmly held between them when they are forced together by the screw-ring P.

A series of screws or bolts may be substituted for the screw-ring for the purpose of attaching the inlet-chamber and the case together and of securing the periphery of the diaphragm in place; but I prefer to employ the screw-ring.

The valve-seat J consists of a short tube or collar, the inner end of which is shaped to act as a seat for the valve E, and is attached to the wall of the inlet-chamber by means of two or more radial bars, R, the openings between which permit the free action of the pressure of the gases in the chamber upon the outer face of the diaphragm D. The inlet-chamber is provided with an inlet-passage, B, through which the gases in the fermenting-cask are allowed to communicate with the chamber.

The inlet-passage may be provided with a cock, T, Figs. 1 and 2, by which the communication between the fermenting-cask and the regulator may be cut off, if desired. A pressure-gage, U, may also be attached to the inlet-chamber by means of the pipe V.

The center of the diaphragm is perforated to fit over the valve-seat J, and it is secured in place just outside the valve-seat by a ring or collar, S, which clamps the diaphragm against a circular flange, W, Fig. 2. The collar S may be secured by a series of screws, or, preferably, by being screwed onto the valve-seat, the exterior of which is threaded to receive it. It will thus be seen that the diaphragm is firmly connected at or near its center and at its periphery to the casing, so that its intermediate annular surface is free to move, in consequence of the flexibility or elasticity of the material of which the diaphragm is composed, under the pressure of the gases in the inlet-chamber, which movement is transmitted directly to the valve E by means of the ring G and arms X X. (See Fig. 8.)

The diaphragm D is made of sheet rubber or other suitable fabric. The valve E is also of rubber, but of a harder or less elastic quality than that used for the diaphragm. The ring G is preferably slightly rounded on the face which bears against the diaphragm, as shown in the sectional views. The ring G is attached, by means of the arms X X, to the boss Q, which is provided with a threaded opening, into which the end of the valve-stem F is screwed, by which means the valve E is held in place against a circular flange, a, Fig. 2.

The valve E is constantly pressed against the valve-seat J by the spring H, except at such times as the valve is forced away from the valve-seat by the pressure of the gases in the inlet-chamber moving the diaphragm toward the right hand in Fig. 2. The spring H bears at one end against a shoulder or collar, b, on the valve-stem, and at the other against the nut Y, which is fitted to the adjusting-screw L, being prevented from turning when the screw revolves by the lug or lugs c c, which are arranged to slide in the ways or grooves d d, Fig. 6, in the casing A. The adjusting-screw is made tight in the boss K by means of a stuffing-box and screw-follower, Z. By turning the screw in one direction or the other the nut Y is caused to travel along the screw, and the tension of the spring H can be adjusted so that my improved pressure-regulator will blow off at any desired pressure.

In Fig. 1 of the drawings I have represented my improved pressure-regulator as provided with a single inlet-passage, designed to be connected with a single fermenting-cask; but it is obvious that my improvement may be connected with a number of casks by suitable piping; or the inlet-chamber may be modified in form so that it may be provided with a number of inlet-passages, as represented in Fig. 7, in which I' is a cylindrical or suitably-shaped receiver, provided with the inlet-passages B', to any or all of which suitable tubes or pipes connecting with separate fermenting-casks may be attached. The inlet-passages B' may also be provided with suitable stop-cocks, so that the communication between any of the casks and the regulator may be cut off, if desired. The receiver I' is connected to the casing by means of a neck, e, which is provided with a flange secured to the casing by a screw-ring, as already described.

I claim—

1. The combination, in a pressure-regulator, of a suitable casing provided with inlet and outlet passages, a flexible diaphragm secured to the casing at its center and periphery, a centrally-located valve-seat, and a spring-actuated valve provided with a ring bearing on the free portion of the diaphragm, substantially as described.

2. The combination, in a pressure-regulator, with a suitable casing provided with inlet and outlet passages, of the flexible diaphragm D, secured to the casing at its center and periphery, the valve-seat J, valve E, ring G, spring H, and adjusting-screw L, substantially as described.

3. The combination, with the diaphragm D and valve-seat J, of the ring G and valve E, secured in the boss Q by the threaded valve-stem F, substantially as described.

4. The combination, with the casing A, having outlet-passage C, of the inlet-chamber I, provided with valve-seat J, and the diaphragm D, secured to the inlet-chamber around the valve-seat by ring S and at its periphery between the flanges O and N, and the spring-actuated valve E, having ring G connected therewith, substantially as described.

5. In a pressure-regulator, a flexible valve-operating diaphragm forming a partition between the inlet and outlet chambers and secured thereto at its center and circumference, substantially as described.

6. The combination, in a pressure-regulator, with the casing A, having flange N and outlet-passage C, of the inlet-chamber I, provided with centrally-located valve-seat J, connected to the inlet-chamber by bars R, the flexible diaphragm D, fastened at its center to the inlet-chamber and at its periphery between the casing and inlet-chamber, and the spring-actuated valve E, having ring G connected therewith, substantially as described.

7. The combination, in a pressure-regulator, with the case A, having flange N outlet-passage C, and boss K, of the inlet-chamber I, provided with centrally-located valve-seat J, connected to the inlet-chamber by bars R, the flexible diaphragm D, screw-rings P and S, valve E, ring G, spring H, and means for adjusting the tension of the spring, substantially as described.

A. S. BIGELOW.

Witnesses:
JOSIAH SULLIVAN,
H. G. PHILLIPS.